United States Patent
Norris et al.

(10) Patent No.: US 10,344,938 B2
(45) Date of Patent: *Jul. 9, 2019

(54) MULTI-COLORED VEHICLE REAR LAMP

(71) Applicant: Grote Industries, Inc., Madison, IN (US)

(72) Inventors: Brian K. Norris, Madison, IN (US); Randall Staggs, Indianapolis, IN (US); Nakul Anand, Madison, IN (US); Shawn S. Smith, Jeffersonville, IN (US); Christopher C. Riley, Madison, IN (US); Mark D. Noe, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/461,660

(22) Filed: Mar. 17, 2017

(65) Prior Publication Data
US 2017/0184271 A1 Jun. 29, 2017

Related U.S. Application Data

(63) Continuation of application No. 14/690,926, filed on Apr. 20, 2015, now Pat. No. 9,599,307, which is a (Continued)

(51) Int. Cl.
*F21V 21/00* (2006.01)
*F21S 43/20* (2018.01)
(Continued)

(52) U.S. Cl.
CPC .......... *F21S 43/255* (2018.01); *B60Q 1/0088* (2013.01); *B60Q 1/22* (2013.01);
(Continued)

(58) Field of Classification Search
CPC ...... F21S 48/215; F21S 48/22; F21S 48/2218; B60Q 1/2607; B60Q 1/44; B60Q 1/444
(Continued)

(56) References Cited

U.S. PATENT DOCUMENTS 6,102,559 A     8/2000   Nold et al.
6,250,788 B1 *   6/2001   Muller ................. B60Q 1/2696
                                                      362/541

(Continued)

OTHER PUBLICATIONS

"All LED Box Lamps" Engineering Data Sheet, Grote Industries, Dec. 2006.
(Continued)

*Primary Examiner* — Matthew J. Peerce
(74) *Attorney, Agent, or Firm* — Woodard Emhardt Henry Reeves & Wagner LLP

(57) ABSTRACT

A lamp for the rear of a vehicle is disclosed with a light transmissive cover having a red first illuminated surface area and a clear second illuminated surface area. It has a first LED light emitter located directly beneath the red first area, a second LED light emitter located directly beneath the clear second area, and a third LED light emitter, also located directly beneath said clear second area. The third red LED light emitter is for emitting red light through the clear second area simultaneously with light transmitted through the red first area, whereby the first and second areas are adapted to collectively form a contiguous red illuminated surface area.

23 Claims, 12 Drawing Sheets

Related U.S. Application Data continuation of application No. 13/795,334, filed on Mar. 12, 2013, now Pat. No. 9,010,975.

(51) Int. Cl.

| | | |
|---|---|---|
| *F21S 43/14* | (2018.01) | |
| *B60Q 1/26* | (2006.01) | |
| *B60Q 1/34* | (2006.01) | |
| *B60Q 1/44* | (2006.01) | |
| *B60Q 1/00* | (2006.01) | |
| *B60Q 1/22* | (2006.01) | |
| *B60Q 1/30* | (2006.01) | |
| *F21Y 101/00* | (2016.01) | |
| *F21Y 115/10* | (2016.01) | |
| *F21Y 113/13* | (2016.01) | |

(52) U.S. Cl.
CPC ............ *B60Q 1/2607* (2013.01); *B60Q 1/30* (2013.01); *B60Q 1/34* (2013.01); *B60Q 1/44* (2013.01); *F21S 43/14* (2018.01); *F21S 43/20* (2018.01); *F21S 43/26* (2018.01); *B60Q 2400/20* (2013.01); *F21Y 2101/00* (2013.01); *F21Y 2113/13* (2016.08); *F21Y 2115/10* (2016.08)

(58) Field of Classification Search
USPC ........................................................ 362/545
See application file for complete search history.

(56) References Cited

U.S. PATENT DOCUMENTS

| | | | |
|---|---|---|---|
| 6,367,949 B1 | 4/2002 | Pederson | |
| 6,499,870 B1 | 12/2002 | Zwick et al. | |
| 6,550,949 B1 | 4/2003 | Bauer et al. | |
| 6,550,950 B1* | 4/2003 | Fernandez | B60Q 1/20 |
| | | | 362/540 |
| 6,672,745 B1 | 1/2004 | Bauer et al. | |
| 6,786,625 B2 | 9/2004 | Wesson | |
| 6,811,287 B2 | 11/2004 | Roller et al. | |
| 6,896,397 B2 | 5/2005 | Yamada et al. | |
| 6,897,771 B1 | 5/2005 | Lodhie et al. | |
| 6,902,307 B2 | 6/2005 | Strazzanti | |
| 7,111,968 B2 | 9/2006 | Bauer et al. | |
| 7,268,679 B2 | 9/2007 | Briz | |
| 7,275,839 B2 | 10/2007 | Coushaine et al. | |
| 7,342,707 B2 | 3/2008 | Roberts et al. | |
| 7,347,597 B2 | 3/2008 | French | |
| 7,525,254 B2 | 4/2009 | Lys et al. | |
| 7,568,823 B2 | 8/2009 | Bauer et al. | |
| 7,674,026 B2 | 3/2010 | Uchida et al. | |
| 8,021,028 B2 | 9/2011 | Riesebosch | |
| 8,052,313 B2 | 11/2011 | Sassoon | |
| 8,313,223 B2 | 11/2012 | Ota et al. | |
| 8,348,484 B2 | 1/2013 | Chaterlea et al. | |
| 8,441,194 B2 | 5/2013 | Huang | |
| 8,564,205 B2 | 10/2013 | Roberts et al. | |
| 2004/0246741 A1 | 12/2004 | You et al. | |
| 2006/0002126 A1 | 1/2006 | Koizumi et al. | |
| 2008/0130303 A1 | 6/2008 | Medina et al. | |
| 2009/0122566 A1 | 5/2009 | Cunningham | |
| 2012/0106180 A1 | 5/2012 | Peltonen | |
| 2012/0120672 A1* | 5/2012 | Stagg | B60Q 1/2607 |
| | | | 362/510 |
| 2012/0256543 A1 | 10/2012 | Marcove et al. | |
| 2012/0314437 A1 | 12/2012 | Saxena | |
| 2013/0329444 A1 | 12/2013 | Oh | |
| 2014/0119039 A1* | 5/2014 | Lin | B60Q 1/46 |
| | | | 362/511 |

OTHER PUBLICATIONS

"LED Clear Lens Hi Count" Data Sheet, Grote Industries.
"Oval Hi Count LED 56-Diode Stop/Tail/Turn Lamp" Product Data Sheet, Grote Industries, Feb. 2008.
"Oval LED Stop, Tail, Turn Lamp" Product Data Sheet, Grote Industries, Oct. 2007.
"SuperNova NexGen 4" LED Stop/Tail/Turn Lamp" Product Information Sheet, Grote Industries, Jun. 2012.

* cited by examiner

MULTI-COLORED VEHICLE REAR LAMP

BACKGROUND

The present invention relates to lamps, an more specifically to such lamps used on the rear of vehicles.

Rear lamps on vehicles are governed by regulations, in the U.S. and other countries. These include, for example in the U.S.A., 49 C.F.R. Sec. 571. These may generally include one or more requirements regarding candela, illuminated surface area, placement, and other attributes, normally grouped by various function or location. The Federal Motor Vehicle Safety Standard, FMVSS 108, in Part 571.108 of the Code of Federal Regulation Title 49, specify that vehicles over 2032 mm wide are required to have stop lamp with a lens area (Effective Projected Luminous Lens Area (EPLLA)) of at least 75 square centimeters. Other vehicles EPLLA requirements vary. The area for cars need be at least 59 square centimeters. A circular stop lamp used on a large trailer today will be approximately 10 cm in diameter or about 78.5 square cm of area. This may be met, for example, with a standard nominal 4 inch or 10 cm diameter circular lamp, meaning the housing is also circular and has a diameter of about ten (10) centimeters (or about 4 to 4½ inches), or with an oval shaped lamp, meaning that the housing is also oval. The size and shape of such oval housing may vary, but a typical example may be an oval with dimensions of about 2½ inches tall and about 6¾ inches wide. As shown here it is desirable to meet illuminated surface area requirements or goals while providing an arrangement that is more space efficient. Various stop-tail-turn (STT) lamps used LEDs with a large lamp with separate cavities or other areas, such as one cavity for the STT functions and another for other functions, such as a dedicated white LED backup light. Other LED STT lamps use additive chromatic effects to alter color patterns. Also, separate dedicated lamps, such as separate white LED back-up (or reverse) lamps, have been used. While each approach has various pros and cons, they do not provide the arrangements and advantages of the present claimed designs.

Thus, there is a need for improvement in this field.

SUMMARY

The invention is set forth by the claims and only the claims. Generally, it can be summarized as a lamp for the rear of a vehicle with a light transmissive cover having a red first illuminated surface area and a clear second illuminated surface area. The lamp includes, but is not limited to, is a first LED light emitter located directly beneath the red first area. There also is included a white second LED light emitter located directly beneath the clear second area. Also, there is included a third red LED light emitter, also located directly beneath said clear second area. The third red LED light emitter for emitting red light through the clear second area simultaneously with light transmitted through there red first area, whereby the first and second areas are adapted to collectively form a contiguous red illuminated surface area.

The invention solves the problem of meeting illuminated surface area requirements or goals while providing an arrangement that is more space efficient. It also may provide greater flexibility for lamp design while meeting standards, with such flexibility being available for varied and/or improved aesthetic design. Further forms, objects, features, aspects, benefits, advantages, and embodiments of the present invention will become apparent from the detailed description and drawings provided herewith.

DESCRIPTION OF THE SELECTED EMBODIMENTS

Figure 1:
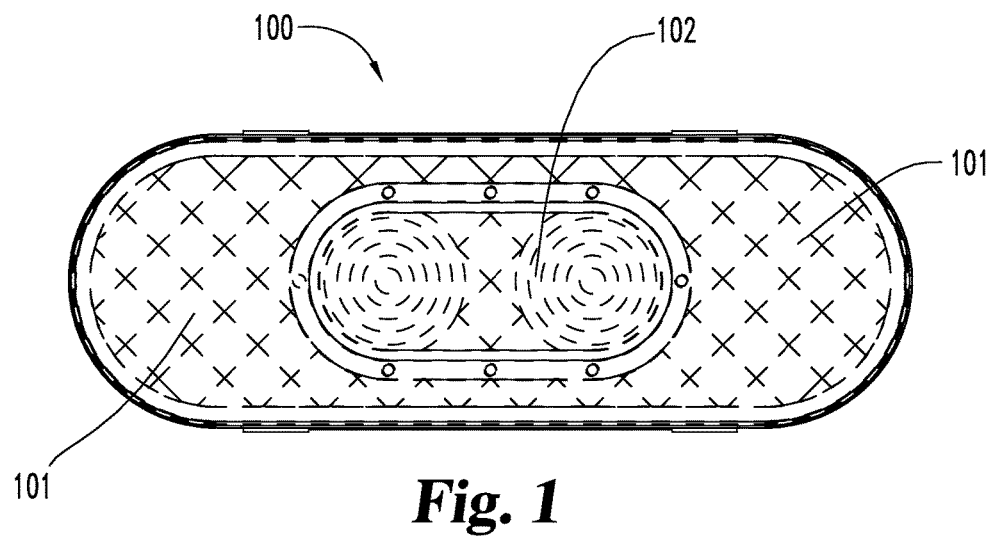
FIG. 1 is a rear elevation view (when mounted) of a first embodiment.
Figure 2:
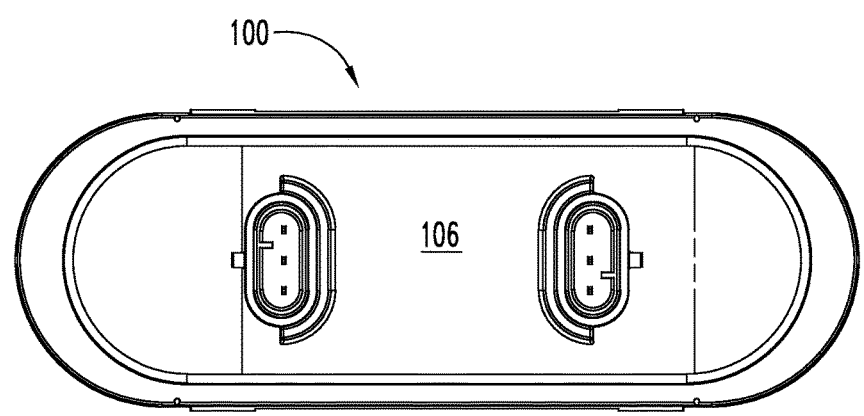
FIG. 2 is a front elevation view (albeit hidden when mounted) of a first embodiment.
Figure 3:
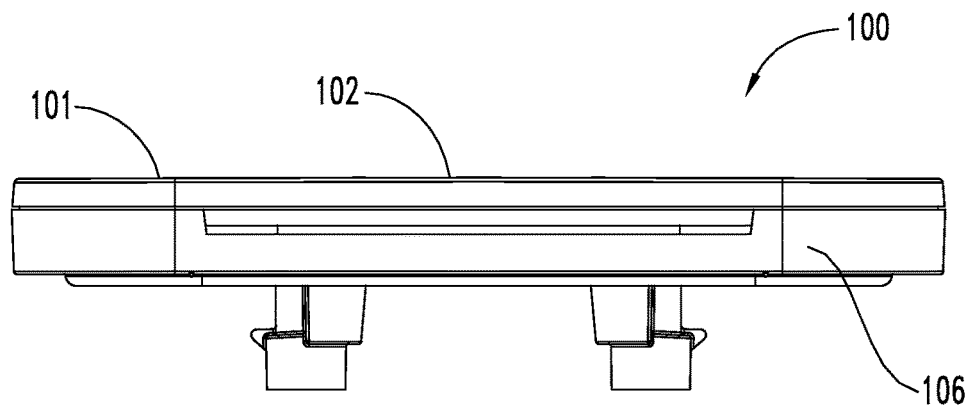
FIG. 3 is a plan view of a first embodiment, symmetrically showing the top and bottom plan view when mounted.
Figure 4:
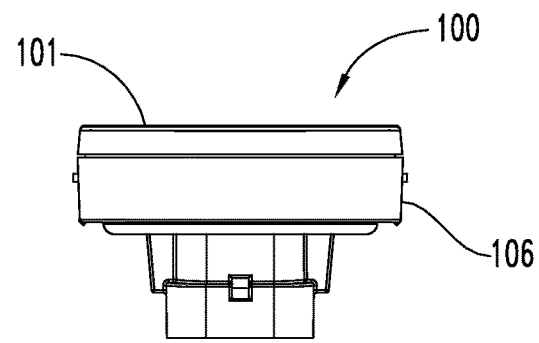
FIG. 4 is a side elevation view of a first embodiment, symmetrically showing the right and left elevation view when mounted.
Figure 5:
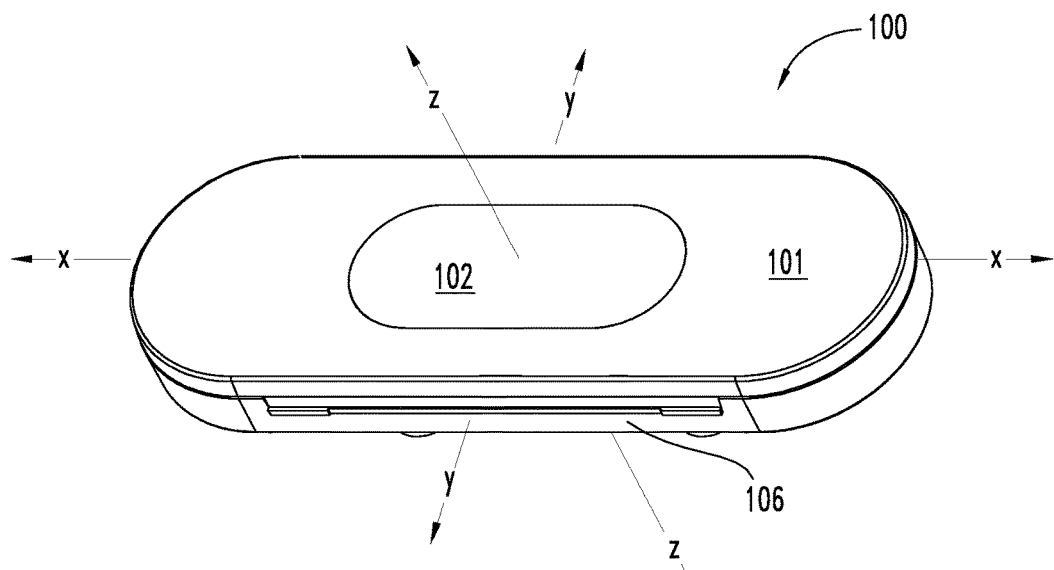
FIG. 5 is a top perspective view of a first embodiment.
Figure 6:
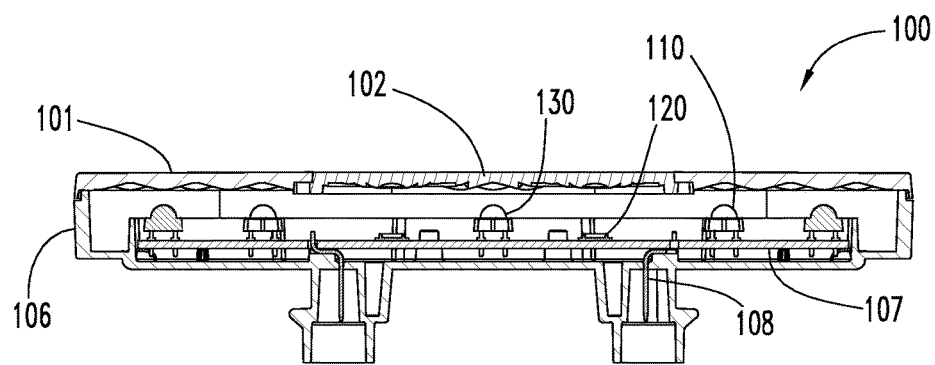
FIG. 6 is a full sectional view of a first embodiment taken along a Z-X plane.
Figure 7:
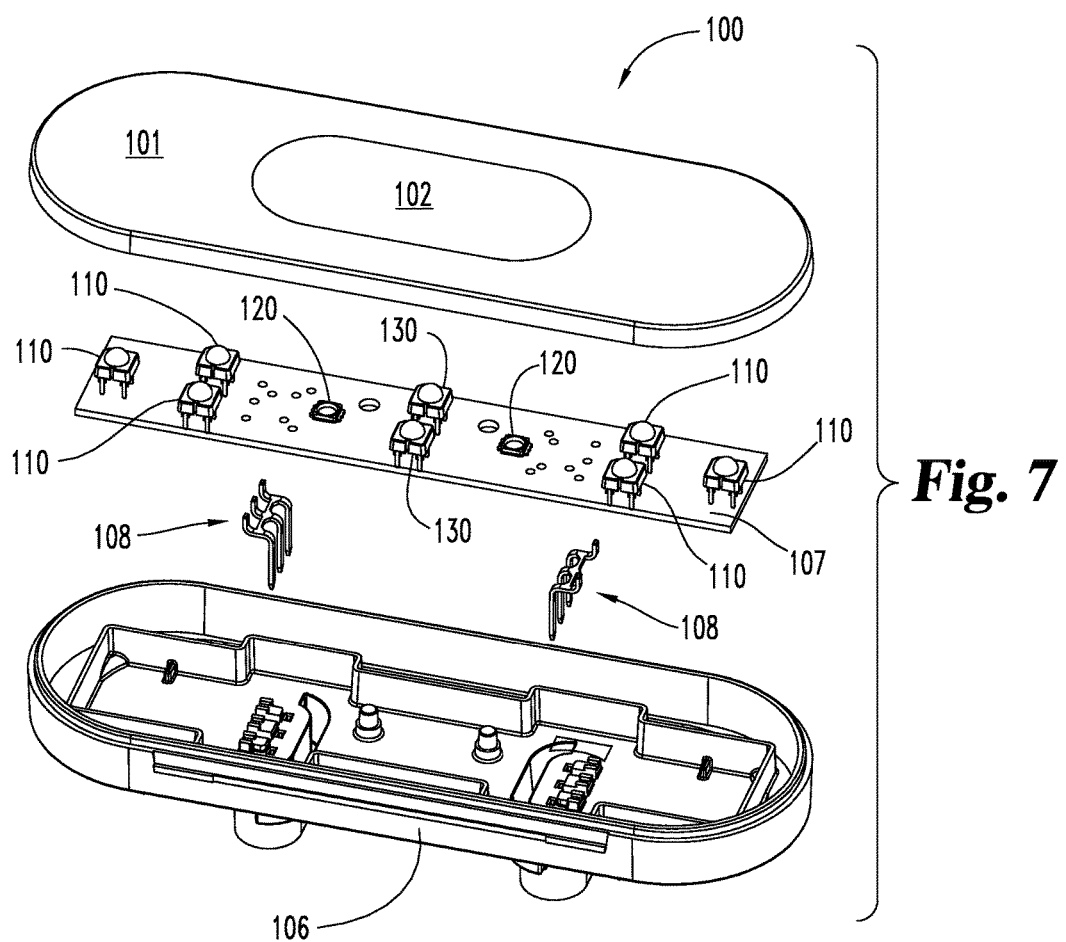
FIG. 7 is an exploded top perspective view of a first embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in greater detail, although it will be apparent to those skilled in the relevant art that some features that are not relevant to the present invention may not be shown for the sake of clarity.

Referring to FIGS. 1-11E, some examples of the invention are shown. Note that one such example, as shown in FIGS. 1-5, illustrates an ornamental design for a vehicle lamp as shown. In that regard, optionally portions of the "front" of such lamp installed lamp (FIG. 2) may be shown in phantom lines, being normally out of sight when that portion of that lamp is mounted on a vehicle.

Figure 8A:
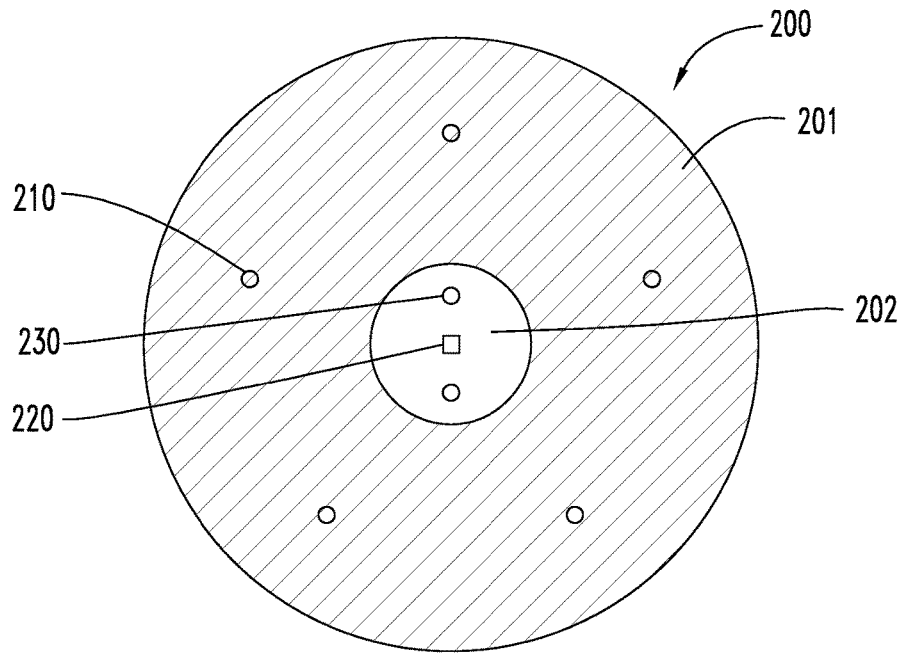
FIGS. 8A and 8B are a rear elevation view of a second embodiment.
Figure 8B:
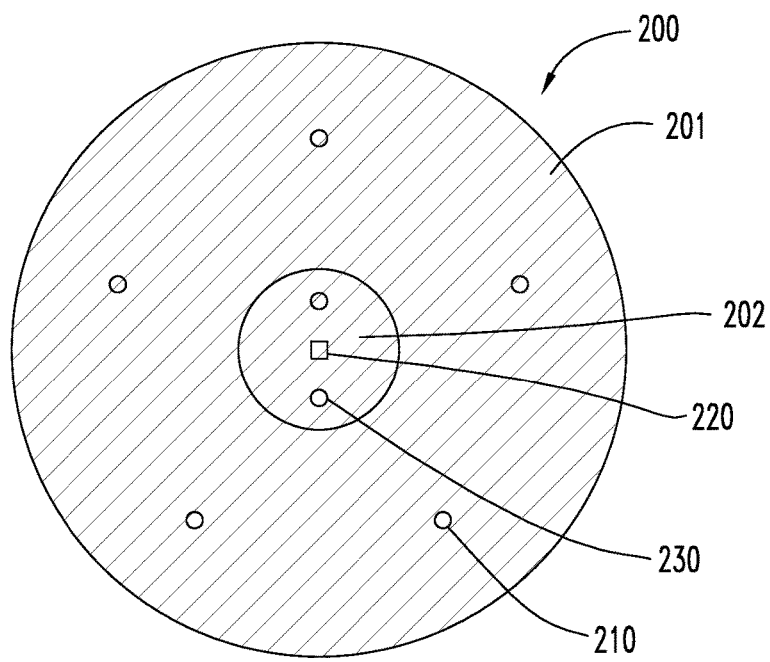
Figure 9A:
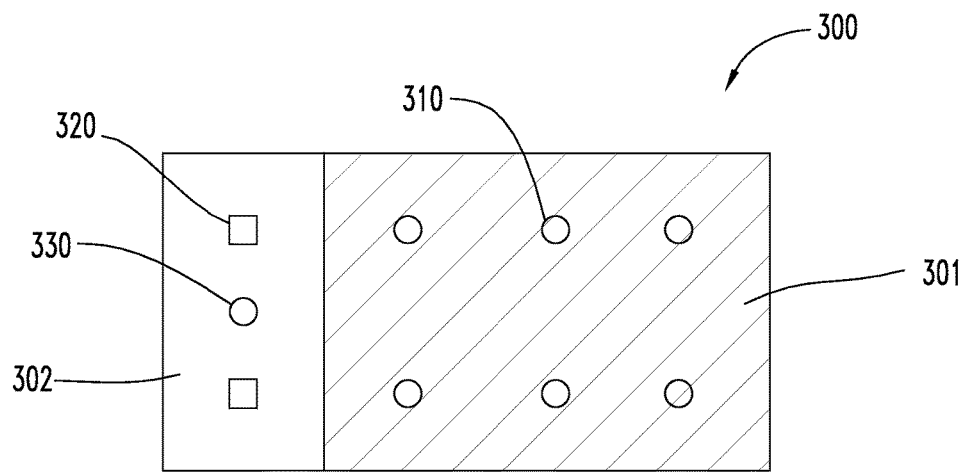
FIGS. 9A and 9B are a rear elevation view of a third embodiment.
Figure 9B:
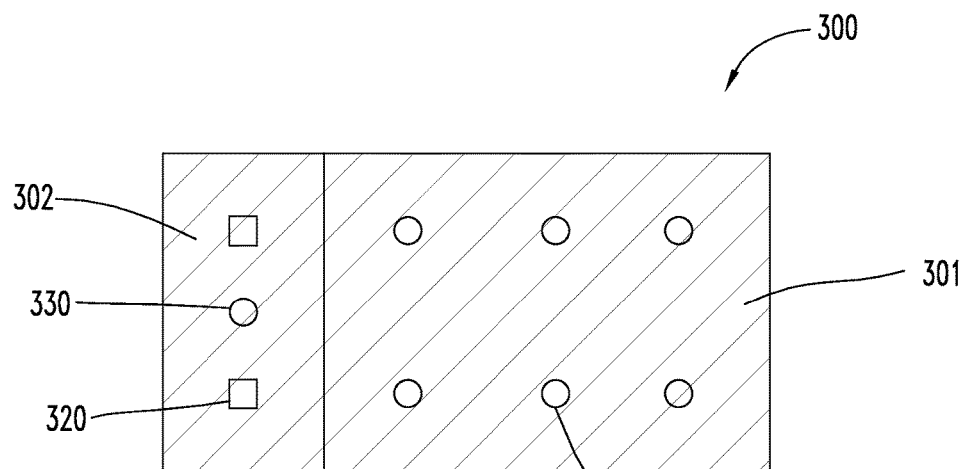
Figure 10A:
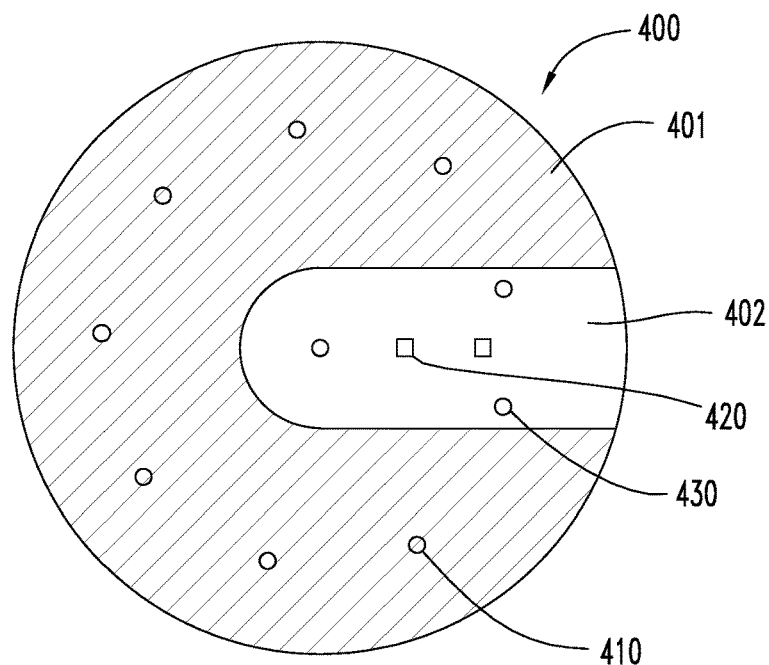
FIGS. 10A and 10B are a elevation plan view of a fourth embodiment.
Figure 10B:
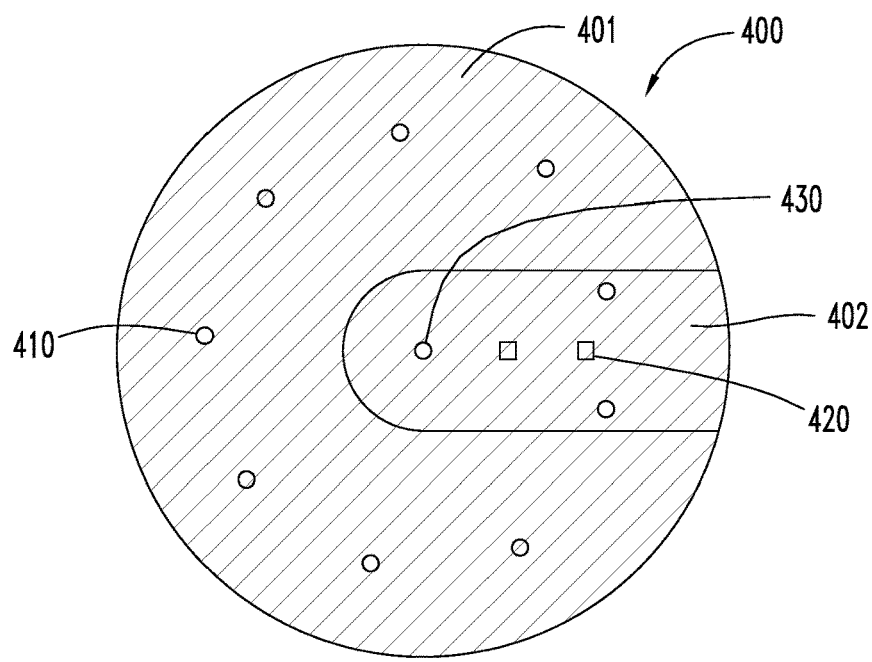
Figure 11A:
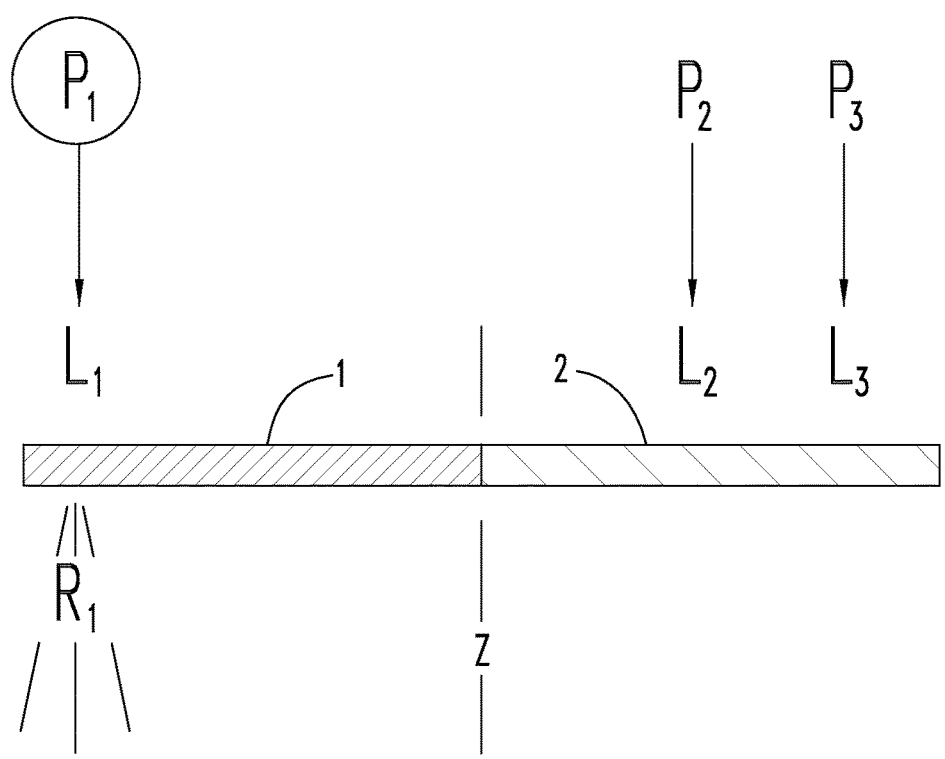
FIGS. 11A-E are conceptual diagrams of example of lighting configurations.
Figure 11B:
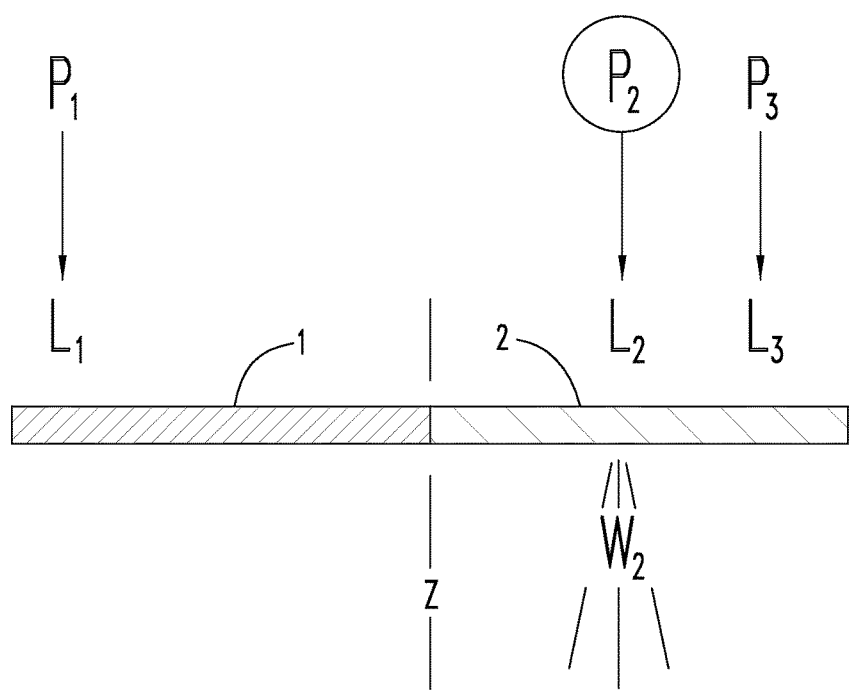
Figure 11C:
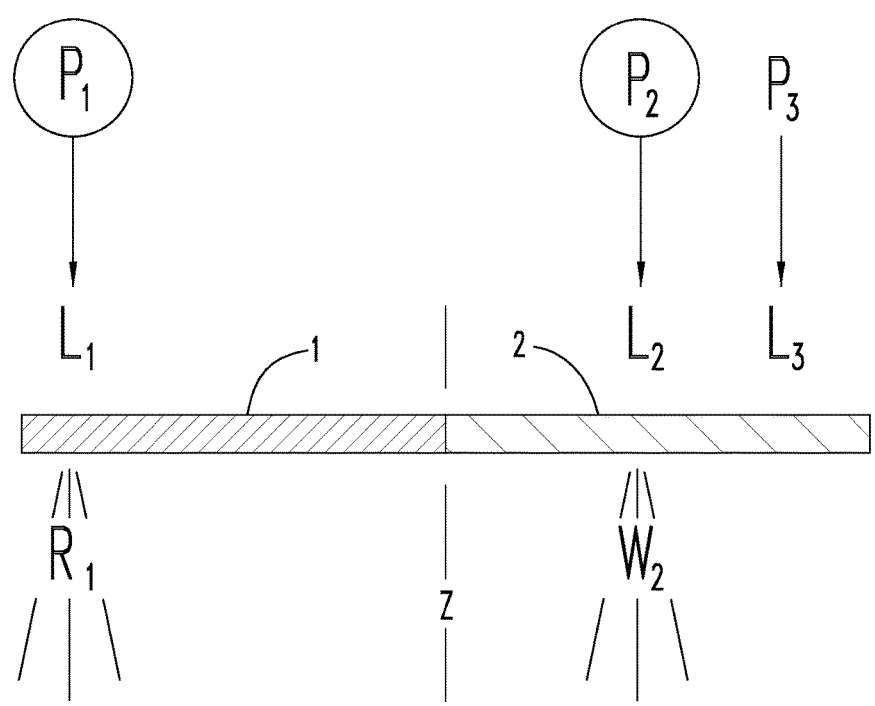
Figure 11D:
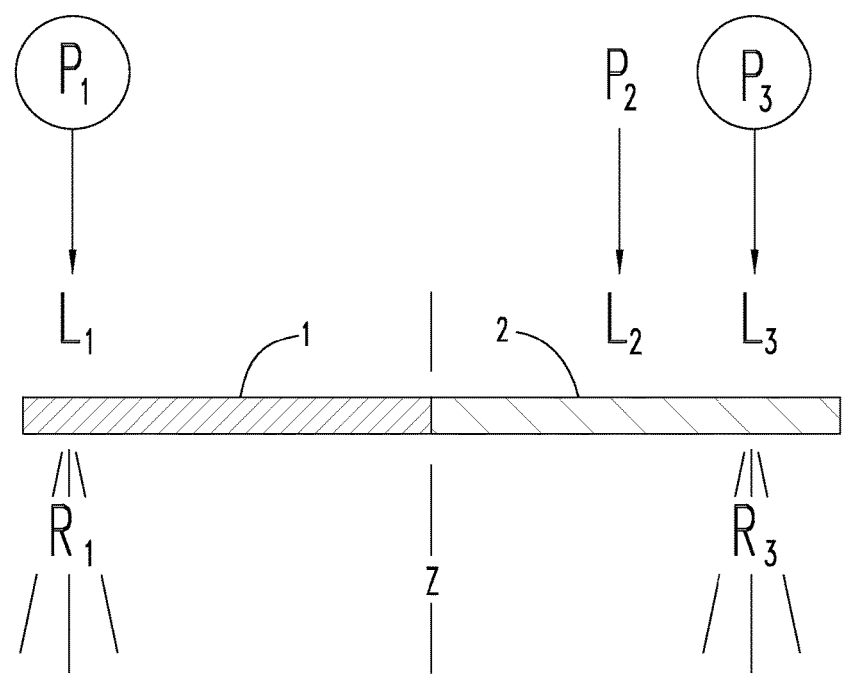
Figure 11E:
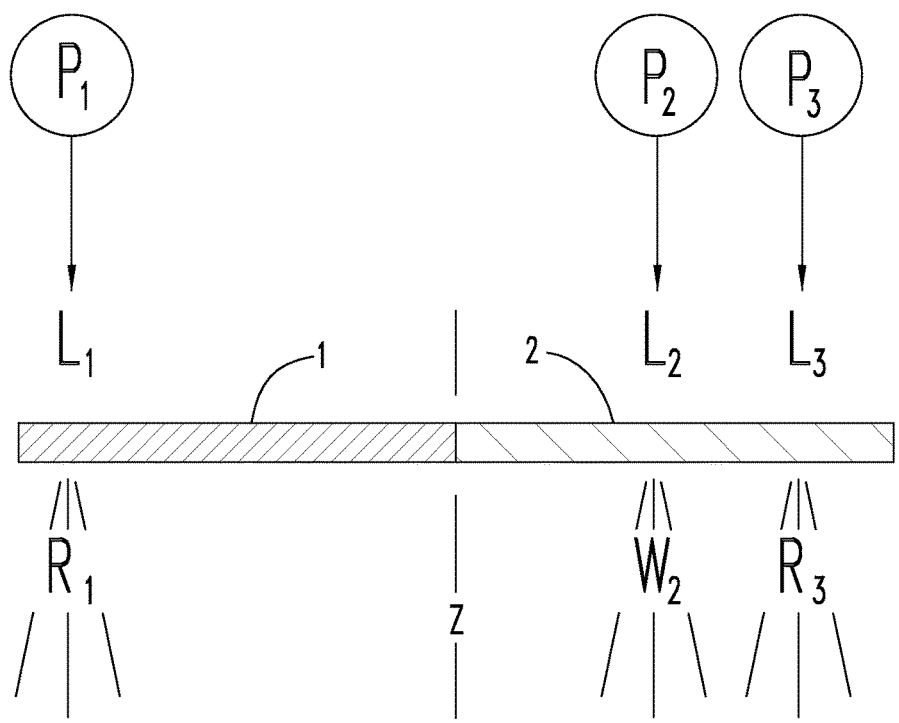

Various examples are shown with similar reference figures, but with the hundred's digit prefix otherwise varied. Hence, in the drawings FIGS. 1-7 show lamp 100, FIGS. 8A and 8B show lamp 200, FIGS. 9A and 9B show lamp 300, and FIGS. 10A and 10B show lamp 400. Otherwise, the reference characters in the ten's and one's digits, when the same, are the same or similar. These illustrate, a lamp 100, 200, 300, 400 for the rear of a vehicle (not shown). The lamp includes a light transmissive cover having a first illuminated surface area 1, 101, 201, 301, 401 and a second illuminated surface area 2, 102, 202, 302, 402. The first area of the cover is light transmissive and red in color. There is one or more first LED light emitter 110, 210, 310, 410 located directly beneath the first area of the cover. Normally, one or more such first light emitters is red in color, but other optional colors, such as white, or color combinations are optional.

The second area 2, 102, 202, 302, 402 of the cover is also light transmissive and is clear in color. Moreover, there is one or more second light emitter 120, 220, 320, 420 located directly beneath the clear second area. The second light emitter comprises an LED that emits white light. Alternatively, the second light emitter may comprise an emitter, such as an LED, that emits amber light, such as for example upon the activation of a turn indicator.

Additionally, one or more third light emitter 130, 230, 330, 430 located directly beneath the clear second area. The third light emitter emitting comprises an LED for emitting red light through the clear second area simultaneously with light transmitted through the red first area, whereby the first and second areas are adapted to collectively form a contiguous red illuminated surface area. The lamp does not have motors or moving parts. The covers, and their first and second areas, and the LEDs are fixed and non-movable.

FIGS. 11A-E show, conceptually, some various illumination combinations. These are not the only possible combinations, and merely are examples. The reference character convention therein has power source, $P_1$, $P_2$, $P_3$, such as electricity and/or their controller(s). When such power source is activated, in FIGS. 11A-D, it is shown encircled. Upon activation, one or more of the light emitters, $L_1$, $L_2$, $L_3$, such as LEDs, emit light. Cover 1 (red) and cover 2 (clear) are shown, covering in the Z-axis, the various light emitters. Upon activation, one or more of the light emitters, $L_1$, $L_2$, $L_3$, cause red light $R_1$, red light $R_3$, and/or white light $W_1$, to be emitted from the lamp. Alternatively, white light $W_1$ may be substituted with (or also have in addition) an amber light (not shown). For example, the shading of the first area and/or the second area, in FIGS. 8A-10B, indicate red light emitted from that area. Thus, for example, the conceptually illumination shown in FIG. 11A corresponds to the red illuminated shading of only first red areas 201, 301 and 401 in FIGS. 8A, 9A and 10A, respectively. And, for example, the conceptually illumination shown in FIGS. 11D and/or 11E corresponds to the red illuminated shading of both first red areas 201, 301 and 401 as well as red light from second clear areas 202, 302 and 402 in FIGS. 8B, 9B and 10B, respectively.

While the example of FIGS. 1-7 shows six first light emitters (three on each of two sides), two second (white) light emitters, and two third (red) light emitters, more or less of each may be used. Also, there may be more than one red first area(s) and/or more than one second clear area(s) of the cover of the lamp. Also, other non-LED light emitters, such as incandescent bulbs or other devices that emit light may be substituted, although the preferred designs use LEDs.

Optionally, the lamp is a stop-tail-turn lamp for a vehicle and wherein the sum of the first illuminated surface area 101, 201, 301, 401 and the second illuminated surface area 102, 202, 302, 402 is at least fifty (50) square centimeters, and more preferably is at least seventy-five (75) square centimeters and less than 100 square centimeters, and more preferably is less than 85 square centimeters. However, other collective illuminated surface areas are possible, per 49 C.F.R. § 571.108, such as for a stop lamp for a motorcycle at least 5000 square millimeters (and preferably, but optionally, less than 8,000 square millimeters). For other vehicles less than 2032 millimeters in overall width, for stop lights in a single or combined compartment light, the collective illuminated surface area preferably is at least 5000 square millimeters (and preferably, but optionally, less than 8,000 square millimeters).

Optionally, the various emitters are activated upon one or more various events. For example, optionally the lamp may have the white second light emitter 120, 220, 320, 420 is activated upon the vehicle being placed in reverse. Optionally, although not normally, the red third light emitter 130, 230, 330, 430 may be de-activated upon the vehicle being placed in reverse. Preferably, however, such second and third light emitters are on concurrently (see e.g. FIG. 11E). Also, optionally, the red third light emitter 130, 230, 330, 430 is activated upon the vehicle braking. More commonly, however, as discussed below regarding light intensity, the first and third emitters, both normally red, are both activated in tail lamp mode, and are still activated, but emit brighter light, during braking or stop mode. Likewise, even if the headlamps are off and/or the first and third lamps are otherwise not in tail lamp mode, during braking or stop mode preferably they are activated and of the brighter, stop lamp, intensity.

Optionally, the lamp may comprises a fourth light emitter (not shown) located directly beneath the clear second area 2, 102, 202, 302, 402 and, wherein the fourth light emitter comprises an LED that emits amber light. This may be used for a flasher and/or turn signal, emitting light from the clear second area. For example, the amber LED is in that case activated upon the corresponding turn signal (left or right) being activated.

A variety of shapes and sizes (in addition to the area ranges above) of the lamp are possible. For example, optionally, the lamp is shaped from a group consisting of: a circle (including optionally a circle with a diameter of about 10 centimeters) (FIGS. 8A, 8B, 10A, 10B); and, an oval (FIGS. 1-7, and in particular FIG. 1). It may be square, elliptical, rectangular (FIGS. 9A and 9B), irregular, or otherwise. Typically, the lamp will have a housing, such as housing 106, and one or more circuit boards, such as circuit board 107.

Optionally, the lamp has no reflector(s), such as for example, parabolic reflector(s), and no barrier wall(s) between the first light emitter(s) and the third light emitter(s) (see e.g. FIGS. 6, 7 and 11A-E). Optionally, not having such reflector(s) and/or walls may pertain as between the first and second light emitter(s) and/or between the second and third emitter(s). The reverse is also true in that, optionally, one may include reflector(s) and/or barrier walls between any of such combination(s) of light emitters.

Optionally, the lamp may be a single compartment lamp or may be a multiple compartment lamp.

Also, optionally the intensity of the various emitted light(s) may be varied. For example, the red light from area 101, 201, 301, 401 (and/or from area 102, 202, 302, 402) may be lower intensity in tail light mode, when the vehicle head lamps are activated, and higher intensity when braking. The red first light emitter and the red third light emitter may optionally each be activated upon the vehicle head lamps being activated. Also, the red first light emitter and the red third light emitter optionally may each emit brighter light upon the vehicle braking. Such intensity may, for example, be achieved by powering additional light emitters and/or by controller the amount of power to the light emitters (by resistors, diodes or otherwise) in the first area 101, 201, 301, 401 and/or area 102, 202, 302, 402. Other features, as are conventional, may of course be provided such as power conductors 108 (FIG. 7) and otherwise.

As used in the claims and the specification, the following terms have the following definitions:

The term "activated upon" here means supplied with electrical power caused by, or in response to, (directly or indirectly) some other event or signal.

The term "amber" here means that color such as typically seen in a turn signal.

The term "clear" here means substantially non-colored so as to be capable of transmitting substantially white light. Clear here includes not only crystal clear material, but also milky white material. Clear here includes not only transparent material, but also translucent material. Clear also includes material with or without lenses, ridges and prisms.

The term "color" here means the predominant light color (for example, red, amber, white, blue, green, yellow, purple, or otherwise) even if it is blended with some non-predominant light wave or frequency light.

The term "cover" here means something which is over, in the Z-axis direction, some other structure. It includes one-piece parts, multi-piece parts, and multi-piece parts fused or otherwise attached to each other.

The term "contiguous" here means adjacent or side by side.

The term "directly beneath" here means under something else (with or without intervening structure) in a Z-axis direction. Within that meaning, "directly" is not limited to any distance, close or far, such as between light emitter and lens.

The term "Illuminated surface area" here means, per 49 C.F.R. § 571.108, the Effective projected luminous lens area (EPLLA), which means the area of the orthogonal projection of the effective light-emitting surface of a lamp on a plane perpendicular to a defined direction relative to the axis of reference. Unless otherwise specified, the direction is coincident with the axis of reference, namely here the Z-axis.

The term "LED" here means light emitting diode, including single diodes as well as arrays of LED's and/or grouped light emitting diodes. This can include the die and/or and LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into a package.

The term "light" here means light which is visible to the naked human eye.

The term "light color" here means the predominant light color visible to the naked human eye (for example, red, amber, white, blue, green, yellow, purple, or otherwise) even if it is blended with some non-predominant light wave or frequency light.

The term "light emitter" here means a device or devices which when electrically energized give off light, such as a bulb or an LED, alone, in groups or rays or otherwise.

The term "light transmissive" here means permitting light to pass through it, such as being transparent, translucent, with or without tint, lenses, ridges and/or prisms.

The term, "multiple compartment lamp" here means, per 49 C.F.R. § 571.108, a device which gives its indication by two or more separately lighted areas which are joined by one or more common parts, such as a housing or lens.

The term "red" here means that color such as typically seen in a STT.

The term "reverse" here means in the sense of placing a vehicle in reverse, or backwards, typically by engaging its transmission to move rearward.

The term "shaped" here means its geometric profile viewed from a Z-axis direction.

The term, "single compartment lamp" here means a lamp device which is not a multiple compartment lamp.

The terms "stop-tail-turn" lamp or "STT" here means a lamp which is compliant with present legal and/or regulatory requirements in this country such as illuminated surface area, candela, and otherwise.

The term "surrounded" here means around at least three quarters of something else (see e.g. FIGS. 8A, 10A). Fully surrounded here means 360 degrees around something else (see e.g. FIGS. 1, 8A).

The term "transmitted through" here means light after it has passed through a light transmissive member or members.

The term "vehicle" here means a self-propelled or towed device for transportation, including without limitation, car, truck, bus, boat, tank or other military vehicle, airplane, truck trailer, truck cab, boat trailer, other trailer, emergency vehicle, and motorcycle.

The term "vehicle braking" here means in response to, directly or indirectly, applying a vehicle's foot brake to slow or stop the vehicle.

The term "X-axis" here means the geometric axis that is perpendicular to the Z-axis and the Y-axis, normally horizontal when the lamp is mounted to a vehicle. Note, for example, in FIG. 1 the lamp is depicted horizontally, with the X-axis horizontally (see FIG. 5). However, the lamp may be mounted otherwise, such as rotated ninety degrees in a vertical orientation, in which case the X-axis and Y-axis are interchanged.

The term "Y-axis" here means the geometric axis that is perpendicular to the Z-axis and the X-axis, normally vertical when the lamp is mounted to a vehicle.

The term "Z-axis" here means the axis of reference, per 49 C.F.R. § 571.108, namely the characteristic axis of the lamp for use as the direction of reference (H=0°, V=0°) for angles of field for photometric measurements and for installing the lamp on the vehicle.

The following numbered clauses set out specific embodiments that may be useful in understanding the present invention:

1. A lamp for the rear of a vehicle, including:
   a light transmissive cover having a first illuminated surface area and a second illuminated surface area;
   (a) said first area of said cover being light transmissive and being red in color;
      (1) a first LED light emitter located directly beneath said first area;
   (b) said second area being light transmissive and being clear in color;
      (2) a second light emitter located directly beneath said clear second area and, wherein said second light emitter comprises an LED that emits white light;
      (3) a third light emitter located directly beneath said clear second area, said third light emitter emitting comprises a red LED for emitting red light through said clear second area simultaneously with light transmitted through said red first area, whereby said first and second areas are adapted to collectively form a contiguous red illuminated surface area.

2. The lamp of clause 1 wherein the lamp is a stop-tail-turn lamp for a vehicle and wherein the sum of said first illuminated surface area and said second illuminated surface area is at least 50 square centimeters and is less than 100 square centimeters.

3 The lamp of clause 2 wherein said white second light emitter is activated upon the vehicle being placed in reverse.

4. The lamp of clause 3 wherein said red first light emitter and said red third light emitter are each activated upon the vehicle head lamps being activated.
5. The lamp of clause 4 wherein wherein said red first light emitter and said red third light emitter each emit brighter light upon the vehicle braking.
6. The lamp of clause 5 wherein the lamp is a stop-tail-turn lamp for a vehicle and wherein the sum of said first illuminated surface area and said second illuminated surface area is at least 75 square centimeters and is less than 100 square centimeters.
7. The lamp of clause 6 wherein said lamp comprises a fourth light emitter located directly beneath said clear second area and, wherein said fourth light emitter comprises an LED that emits amber light.
8. The lamp of clause 7 wherein said lamp is shaped from a group consisting of: (a) a circle with a diameter of about 10 centimeters; and, (b) an oval.
9 The lamp of clause 1 wherein said white second light emitter is activated upon the vehicle being placed in reverse.
10. The lamp of clause 1 wherein said red first light emitter and said red third light emitter are each activated upon the vehicle head lamps being activated.
11. The lamp of clause 10 wherein said red first light emitter and said red third light emitter each emit brighter light upon the vehicle braking.
12. The lamp of clause 1 wherein the lamp is a stop-tail-turn lamp for a vehicle and wherein the sum of said first illuminated surface area and said second illuminated surface area is at least 75 square centimeters and is less than 100 square centimeters.
13. The lamp of clause 9 wherein the lamp is a stop-tail-turn lamp for a vehicle and wherein the sum of said first illuminated surface area and said second illuminated surface area is at least 50 square centimeters and is less than 100 square centimeters.
14. The lamp of clause 9 wherein the lamp is a stop-tail-turn lamp for a vehicle and wherein the sum of said first illuminated surface area and said second illuminated surface area is at least 75 square centimeters and is less than 100 square centimeters.
15. The lamp of clause 9 wherein said lamp comprises a fourth light emitter located directly beneath said clear second area and, wherein said fourth light emitter comprises an LED that emits amber light.
16. The lamp of clause 1 wherein said lamp comprises a fourth light emitter located directly beneath said clear second area and, wherein said fourth light emitter comprises an LED that emits amber light.
17. The lamp of clause 1 wherein said lamp is shaped as a circle with a diameter of about 10 centimeters.
18. The lamp of clause 1 wherein said lamp is shaped as an oval.
19. The lamp of clause 1 wherein said lamp is a single compartment lamp.
20. The lamp of clause 1 wherein said lamp is a multiple compartment lamp.
21. The lamp of clause 1 wherein there is no parabolic reflector and no barrier wall between said first LED light emitter and said third LED light emitter.
22. A lamp for the rear of a vehicle, including:
a light transmissive cover having a first illuminated surface area and a second illuminated surface area;
(a) said first area of said cover being light transmissive and being red in color;
  (1) a first LED light emitter located directly beneath said first area;
(b) said second area being light transmissive and being clear in color;
  (2) a second light emitter located directly beneath said clear second area and, wherein said second light emitter comprises an LED for emitting amber light;
  (3) a third light emitter located directly beneath said clear second area, said third light emitter emitting comprises a red LED that emits red light through said clear second area simultaneously with light transmitted through said red first area, whereby said first and second areas are adapted to collectively form a contiguous red illuminated surface area.
23. The lamp of clause 22 wherein said amber second light emitter is activated upon the activation of a turn indicator.
24. The lamp of clause 23 wherein said lamp is a single compartment lamp.
25. The lamp of clause 23 wherein said lamp is a multiple compartment lamp.
26. The lamp of clause 23 wherein there is no parabolic reflector and no barrier wall between said first LED light emitter and said third LED light emitter.

Articles and phrases such as, "the", "a", "an", "at least one", and "a first", are not limited to mean only one, but rather are inclusive and open ended to also include, optionally, two or more of such elements. In terms of the meaning of words herein, literally different elements or words in dependent claims are not superfluous, and have different meaning and are not to be imported or implied or synonymous with elements or words in the claims from which they depend.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Webster's dictionaries and Random House dictionaries.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:
1. A lamp for the rear of a vehicle, said lamp operable in at least a brake mode and a reverse mode, comprising:
a light transmissive cover having a first illuminated surface area and a second illuminated surface area, wherein said first area of said cover is light transmissive and red in color, and wherein said second area is light transmissive and clear in color;
a first light emitter adapted to emit light from said first red area;
a second light emitter, separate from said first light emitter, said second light emitter adapted to emit white light from said second area; and
a third light emitter, separate from said first and said second light emitters;

wherein said third light emitter is adapted to emit red light through said clear second area;
wherein said first and third light emitters are operable to activate at a first intensity when said vehicle is in said brake mode, and at a second intensity when not in said brake mode, said first intensity being higher than said second intensity;
wherein said second light emitter is operable to activate in said reverse mode;
wherein said first light emitter comprises a plurality of LEDs; and
wherein said plurality of LEDs surround said second light emitter and said third light emitter.

2. The lamp of claim 1, wherein said third light emitter is operable to deactivate in said reverse mode.

3. The lamp of claim 1, wherein said first and third emitters are operable to deactivate when not in said brake mode.

4. The lamp of claim 1, wherein said first and third emitters are operable to activate and deactivate independent of said second light emitter.

5. The lamp of claim 1, comprising:
a first power source P1 adapted for powering said first light emitter during at least said tail lamp mode;
a second power source P2 adapted for powering said second light emitter during said reverse mode; and
a third power source P3 adapted for powering said third light emitter during at least said brake mode.

6. The lamp of claim 5, comprising:
a housing having a first power conductor for providing said first power source P1, a separate second power conductor for said second power source P2, and a separate third power source P3.

7. The lamp of claim 5, wherein power sources P1 and P3 are operable to supply a first power level in said brake mode, and a second power level when not in said brake mode, said first power level being higher than said second power level.

8. The lamp of claim 5, wherein power sources P1 and P3 are operable to supply power to said first and third light emitters when in said brake mode, and wherein said power source P3 is operable to cease supplying power to said third light emitter when not in said brake mode.

9. The lamp of claim 1, wherein said lamp is free of a reflector.

10. The lamp of claim 1, wherein said lamp defines multiple separate internal compartments.

11. The lamp of claim 1 wherein there is no parabolic reflector and no barrier wall between said first light emitter and said third light emitter.

12. The lamp of claim 1, wherein said lamp defines a single internal compartment.

13. The lamp of claim 1, wherein said lamp includes one or more barrier walls positioned between any of said first, second, and third light emitters.

14. The lamp of claim 1, wherein said first light emitter emits red light.

15. The lamp of claim 1, wherein said first light emitter emits white light.

16. The lamp of claim 1, wherein said second clear area of said cover is completely surrounded by said first red area of said cover.

17. The lamp of claim 1, wherein said light transmissive cover has in brake mode an illuminated surface area at least 75 square centimeters and less than 100 square centimeters.

18. The lamp of claim 1, wherein said light transmissive cover is circular and about 4 to 4½ inches in diameter.

19. The lamp of claim 1, wherein said light transmissive cover is oval and about 2½ inches tall and about 6¾ inches wide.

20. The lamp of claim 1, wherein said light transmissive cover has in brake mode an illuminated surface areas that is at least 5000 square millimeters.

21. The lamp of claim 1, wherein said lamp is shaped from a group consisting of: (a) a circle with a diameter of about 10 centimeters; and, (b) an oval.

22. The lamp of claim 1, wherein said first light emitter is located directly beneath said first area.

23. The lamp of claim 1, wherein said second light emitter is located directly beneath said second area.

* * * * *